UNITED STATES PATENT OFFICE.

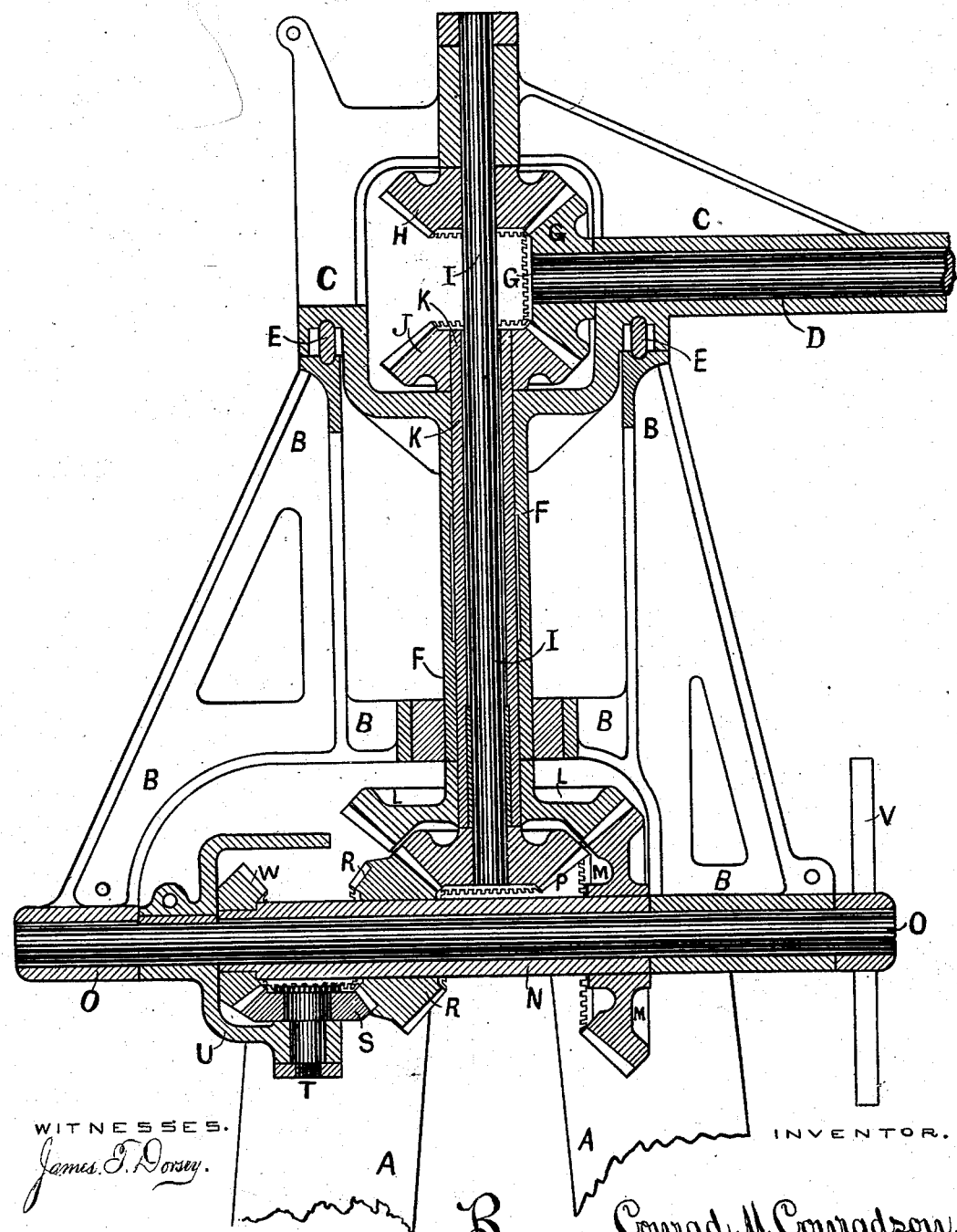

CONRAD M. CONRADSON, OF MADISON, WISCONSIN, ASSIGNOR OF ONE-HALF TO JOHN A. JOHNSON, OF SAME PLACE.

WIND-MOTOR.

SPECIFICATION forming part of Letters Patent No. 283,079, dated August 14, 1883.

Application filed October 12, 1882. (No model.)

*To all whom it may concern:*

Be it known that I, CONRAD M. CONRADSON, of Madison, in the county of Dane and State of Wisconsin, have invented new and useful Improvements in Wind-Motors, of which the following is a specification.

The object of my invention is to provide certain mechanism whereby the tendency of the wind-wheel to swivel or turn from the direct line or point of direction in which the wind blows steadily, or when the wheel shifts with the wind, is overcome; and it consists in the construction, combination, and arrangement of the mechanism hereinafter more fully described, and set forth in the claims.

The figure of the drawing represents a vertical section through the axis of the wind-wheel.

A A represent the tower-posts, to which the cast-iron frame B is rigidly secured in any suitable manner, and supports the turn-table C, provided with a journal-bearing supporting the horizontal shaft D, to which the wind-wheel proper is secured in the usual manner. Friction-rollers E serve to permit the said turn-table C to swivel or revolve horizontally thereon freely, and is provided with a vertical sleeve, F, extending downward, and having a bearing within the frame B, at its lower end, which steadies the same.

To the inward end of the wind-wheel shaft D is secured the bevel-gear wheel G, which engages with the bevel-gear wheel H, secured to the upper end of the vertical shaft I, and at its opposite side with the bevel-gear wheel J, secured to the upper end of the hollow shaft or tube K, which has a journal-bearing at its upper and lower end within the said sleeve F of the turn-table C, as shown, by which means the shaft I and hollow shaft K are driven in opposite directions. To the lower end of said hollow shaft K is secured the bevel-gear wheel L, which engages with the bevel-gear wheel M, secured to one end of the horizontal sleeve N, which is supported and has a bearing upon the central portion of the horizontal shaft O, journaled at each end within the lower portion of the said iron frame B; and to the lower end of the vertical shaft I is secured the bevel-gear wheel P, which engages with the loose double bevel-gear wheel R, adapted to rotate upon the said horizontal sleeve N, which has secured to the opposite end thereof the bevel-gear wheel W, which engages with one side of the bevel-gear wheel S, journaled upon the stud T, which is secured within the yoke U, keyed to the said horizontal shaft O. The opposite side of the said double or reverse bevel-gear wheel R engages with the opposite side of said bevel-gear wheel S, thus counterbalancing the same by an equal pressure upon each or opposite sides thereof.

To the extreme outer end of the horizontal shaft O is secured a sprocket-wheel, V, and over which may be passed a suitable endless chain adapted to transmit the power and motion to a similar wheel secured to a horizontal shaft for driving the machinery in the mill. When the mill is running under a steady current of wind from one direction, there will be an equal pressure upon each side of the bevel-gear wheel S, and consequently it will be carried around the horizontal shaft O, and when the wind changes the bevel-gear wheels R and M will be driven in opposite directions in regard to each other, as it is permitted by the gear-wheel S turning upon its own axis sufficiently to allow for the changed direction of the wind-wheel shaft D. Consequently a change in the direction of the wind will not affect the speed of the driven machinery; and, also, it will be seen that there is no force exerted tending to throw the wind-wheel out of the direct line of the wind, either in a wind blowing steady from one direction or when the wind suddenly changes and shifts the position of the wind-wheel shaft.

Having thus described my invention, what I claim is—

1. The combination, with the wind-wheel shaft D, having the bevel-gear G, and the vertical shafts I and K, provided at their upper ends with the bevel-gears H and J and at their lower ends with the bevel-gears L and P, of the double bevel-gear R, gears S and W, yoke U, horizontal sleeve N, gear M, and horizontal shaft O, having a sprocket-wheel, V, substantially as described, as and for the purposes set forth.

2. The combination, with the geared wind-wheel shaft D, turn-table C, geared vertical shafts I and K, of the horizontal shaft O, having a sprocket-wheel, V, and horizontal sleeve N, having fixed gears M and W and loose double bevel-gear R, and yoke U, having the bevel-gear S, substantially as described, as and for the purposes set forth.

CONRAD M. CONRADSON.

Witnesses:
B. B. CARTER,
CHAS. M. WALES.